US008935306B2

(12) United States Patent
Corbefin (10) Patent No.: US 8,935,306 B2
(45) Date of Patent: Jan. 13, 2015

(54) METHOD OF EXECUTING A COMPUTER APPLICATION, ASSOCIATED KIT AND AIRCRAFT

(75) Inventor: Jean-Philippe Corbefin, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 924 days.

(21) Appl. No.: 12/811,296

(22) PCT Filed: Jan. 7, 2009

(86) PCT No.: PCT/FR2009/000009
§ 371 (c)(1),
(2), (4) Date: Jun. 30, 2010

(87) PCT Pub. No.: WO2009/112663
PCT Pub. Date: Sep. 17, 2009

(65) Prior Publication Data
US 2010/0287545 A1 Nov. 11, 2010

(30) Foreign Application Priority Data
Jan. 11, 2008 (FR) ...................................... 08 50179

(51) Int. Cl.
*G06F 17/30* (2006.01)
*G06F 15/16* (2006.01)
*G06F 9/445* (2006.01)
*G06F 21/57* (2013.01)
*H04L 29/06* (2006.01)

(52) U.S. Cl.
CPC .......... *G06F 9/44584* (2013.01); *G06F 21/572* (2013.01); *H04L 63/08* (2013.01)
USPC ............................................... 707/823; 726/9

(58) Field of Classification Search
CPC ................. G06F 21/572–21/575; H04L 63/08
See application file for complete search history.

(56) References Cited

U.S. PATENT DOCUMENTS

| 6,052,134 | A  | * | 4/2000  | Foster ........................... 345/533 |
| 7,392,541 | B2 | * | 6/2008  | Largman et al. ................. 726/17 |
| 2004/0187106 | A1 | * | 9/2004  | Tanaka et al. ...................... 718/1 |
| 2004/0243797 | A1 |   | 12/2004 | Yang et al. |
| 2005/0076324 | A1 |   | 4/2005  | Lowell et al. |
| 2005/0210077 | A1 | * | 9/2005  | Balakrishnan et al. ........ 707/200 |
| 2006/0022845 | A1 | * | 2/2006  | Fischer ......................... 340/945 |
| 2006/0130004 | A1 |   | 6/2006  | Hughes et al. |
| 2006/0156053 | A1 | * | 7/2006  | Judd et al. .......................... 714/4 |
| 2007/0115938 | A1 | * | 5/2007  | Conzachi et al. ............. 370/352 |

(Continued)

FOREIGN PATENT DOCUMENTS

EP 1 672 509 6/2006

*Primary Examiner* — Tarek Chbouki
(74) *Attorney, Agent, or Firm* — Oblon, Spivak, McClelland, Maier & Neustadt, L.L.P.

(57) ABSTRACT

A method for running a computer application for interfacing with a crew of a vehicle, for example an aircraft, to a corresponding system and to an aircraft including the system. The method reads a removable medium, including the application to be run, by a removable-medium reader with which an on-board running system in the vehicle is equipped, and runs the application by a running mechanism with which the running system is equipped and connected to the removable-medium reader. The running of the application requires permanent recording of data necessary for execution thereof only on the removable medium. As an example, a portable application is used or the running system is booted from an installed operating system provided on the removable medium.

22 Claims, 3 Drawing Sheets

(56) References Cited

U.S. PATENT DOCUMENTS

| | | | |
|---|---|---|---|
| 2008/0163208 A1* | 7/2008 | Burr et al. | 718/1 |
| 2008/0320578 A1* | 12/2008 | Knapp | 726/10 |
| 2009/0198997 A1* | 8/2009 | Yeap et al. | 713/155 |
| 2010/0094484 A1* | 4/2010 | Cornell et al. | 701/3 |

* cited by examiner

METHOD OF EXECUTING A COMPUTER APPLICATION, ASSOCIATED KIT AND AIRCRAFT

This invention relates to computer platforms intended for the functions of operation and maintenance of vehicles, and integrated into the latter. More particularly, the invention concerns a method and a system for application running on such platforms.

In various domains such as aeronautical or automotive, a great number of applications for assistance in operation and/or maintenance is offered to the crew by means of an on-board computer system installed by the manufacturer of the vehicle. This system defines an environment over which the manufacturer has control. It is called hereinafter "manufacturer domain" and in particular "aircraft manufacturer domain" in the specific context of aviation.

This computer system or platform generally interacts with components of the vehicle through servers and with the pilot or maintenance operator through screens and data-capture peripherals. In this way, certain sensitive functions of the vehicle are accessible from this platform, for example the speed regulator or the antilock braking system ABS for the automotive industry, automatic piloting and various on-board electronic instruments connected to the GPS for aeronautics.

Such an information system intended for pilots and aeronautical maintenance operators is known under the name of network server system (NSS or "Network Server System" according to English terminology) in conformity with Arinc standard 763. Mention of such aeronautical platforms in found, for example, in the publications FR 2 895 793, FR 2 892 092, FR 2 831 871 or EP 1 160 160.

It must be noted that high levels of security are required for the integration and/or modification of these platforms intended for the crew. This required security brings this platform dedicated to piloting and/or maintenance into contrast with any other computer platform intended for the passengers, in particular an IFE platform for on-board entertainment ("In-Flight Entertainment" according to English terminology).

Such IFE platforms are mentioned in publications such as WO 2007/093327 or EP 1 367 683.

In practice, the manufacturer guarantees the security of the manufacturer domain by performing, itself, the validation and integration of new equipment items and/or computer applications in the platform dedicated to the crew.

A problem therefore exists for any holder of the vehicle wishing to freely add new applications and functions to this platform.

There thus is specified a "user domain" defined by the environment in which the holder of the vehicle may intervene freely by addition, modification of applications. The "user domain" and the "manufacturer domain" therefore are differentiated by the need for security that the latter demands, for example establishment of sometimes costly certification procedures.

In the automotive domain, such a holder may be a rental company, a company owning a fleet of vehicles or even a private individual.

In the aeronautical domain, around which the remainder of the description is reoriented without, for all that, excluding from the invention other industrial domains having the same problems, this holder may be, in particular, an airline company that charters aircraft for the transport of passengers. Reference then will be made to "company domain" (or "airliner domain").

There also is another prerequisite for a certain number of applications intended for pilots and/or maintenance operators, that derives from the possibility for the latter to be able to have these applications available outside the aircraft, in order, for example, to prepare for a flight (performance calculations), a procedure for intervention or for making a post-flight report from data recorded during the flight.

It emerges from current practice that the known solutions rely on the use of portable personal computers ("Personal Computer" or "PC" according to English terminology) that may be connected to the NSS network of the aircraft during the flight, through docking stations.

These personal computers advantageously replace the pilot's heavy satchel historically used and allow the pilot to be mobile, by transporting his mission data and preparing his performance calculations prior to the flight from his hotel or the departure lounge.

Among the applications widely used in mobile manner, there are distinguished the performance calculation tools, the operating manuals comprising, for example, the verification list ("check lists" according to English terminology), the maintenance manuals.

These personal computers are known under the name of electronic flight bag (EFB for "Electronic Flight Bag"), standardized under the standard TGL36 (Temporary Guidance Leaflet) of the Joint Aviation Authority JAA and taken up in the document Advisory Circular AC No. 120-76A of the Federal Aviation Administration FAA.

Three categories of EFB bags are distinguished.

A class I EFB consists of a portable PC available off the shelf, usable autonomously, if need be supplied through a connector in the aircraft. The display and the control means, for example keyboard and mouse, are autonomous.

A great independence between the PC (airliner domain) and the on-board NSS system (aircraft manufacturer domain) is offered, allowing the airline company to freely install any desired software on this class I EFB.

Nevertheless, such a class I EFB is not usable during certain flight phases, such as, for example, takeoff and landing. Moreover, no access to the avionic parameters is possible because of the absence of interfacing with the NSS platform.

A class II EFB is similar to that of class I, for which a possibility for display and controls deported to cockpit means is offered so as to be able to be used during all flight phases. For example, a screen integrated into the cockpit, a keyboard and a cockpit TrackBall may be used, the PC being connected to these deported interfaces through a docking station. In this way, the portable PC is not attached to the airplane, which allows the pilot to have it available outside the aircraft.

This class II EFB allows read-only access to the avionic parameters. A great independence between the EFB and the NSS platform is preserved, still allowing the airline company to freely install the software that it may desire.

These class I and II EFB generally are chosen by the airline companies. They may be changed frequently or even be different between two pilots working consecutively on the aircraft. They then have the major drawback of requiring a complex integration and installation into the cockpit of the aircraft, for example because it is difficult to have a connector or a docking station sufficiently generic to accommodate all the portable computers available on the market.

Moreover, the aircraft manufacturer has no control over these computers of the airliner domain. In fact, these computers may not meet all the security standards applying to the manufacturers, creating security risks linked to the running of these computers.

The class III EFB is an equipment item that is permanently attached to the airplane, for example the OIT ("Onboard Information Terminal" according to English terminology, corresponding to a display and interaction device for consultation of an electronic version of flight documents such as maintenance manuals) in the Airbus A340 (company name) or which constitutes a part number (identification number in the NSS system) of the manufacturer, for example the EFB in the Airbus A380 (company name). This EFB type III class also allows read-only access to the avionic parameters because of its integration into the system.

Nevertheless, in the case of the class III EFB, the airline company cannot freely deploy software on this EFB without going through the manufacturer as integrator.

The invention thus is intended to resolve the drawbacks of the state of the art.

To this end, the invention applies to a method for running a computer application for interfacing with a crew of a vehicle, the method comprising:

the reading of a removable medium, comprising the said application to be run, by means of a removable-medium reader with which an on-board running system in the vehicle is equipped, the running of the said application by running means with which the said running system is equipped and connected to the said removable-medium reader, the said running of the application requiring the permanent recording of data necessary for running thereof only on the said removable medium.

By "permanent" there is understood here the storage or recording of data beyond the running of the application, that is to say of data that remain in the memories when the application no longer is running. This "permanent" storage is in contrast to "temporary" storage that generally concerns storage of data in a random-access RAM-type memory, in order to allow a microprocessor to conduct the running of the application efficiently.

The invention also applies to a method for running a computer application for interfacing with a crew of a vehicle, the said application using associated data necessary for running thereof, the method comprising:

the reading of a removable medium, comprising the said application to be run, by means of a removable-medium reader with which an on-board running system in the vehicle is equipped, the running of the said application by running means with which the said running system is equipped and connected to the said removable-medium reader, the said running of the application being carried out without permanent storage of the said associated data in the said running system.

This permanent storage applies in particular to non-volatile memories such as the registers of a running system, any rewriteable memory (EEPROM, Flash, . . . ) or hard disks.

The data necessary for running of the application, for example the modification of registers so that the operating system may undertake this running, are distinguished from the data used during running, for example a user file that has no aspect essential for the said running.

According to the invention, the result is that no application datum is recorded long-term in the on-board running system.

It thus is understood that as regards data associated with an application and necessary for running thereof, none of these data is stored permanently anywhere except on the removable medium, so as not to pollute the running system. By way of illustration and as developed below, there are contemplated portable applications that confine the writing of data necessary for running thereof to the one file that comprises them, that is to say on the removable medium when these applications are provided on this medium. Another contemplated example is the presence of an operating system installed on the removable medium and on which the running system boots; the application then run in this operating system involves the writing of data necessary for running thereof only in the registers or other non-volatile memory that are defined by the installation of the operating system, that is to say the removable medium. However, the possibility of more freely manipulating content data such as mission data that may be stored on the removable medium and data attached to the airplane (history of breakdowns and repair, for example) that then are saved in an on-board memory of the airplane, is preserved.

Crew here must be understood as opposed to passengers, that is to say the personnel authorized to intervene and interact with the functional parameters of the vehicle. The crew thus comprises, in particular, the pilot or pilots, the flight personnel and the maintenance operators.

According to the invention, the company is freed from the portable personal computer through the use of a removable medium that comprises the set of applications useful for the personnel considered. In this way, any problem linked with the integration and installation of portable computers, in view of the plurality of existing interfaces, is avoided. In fact, the removable mediums follow more generic connection standards.

Moreover, the use of removable mediums constitutes an economic saving compared with that of portable computers with which each of the participants concerned is equipped. In fact, the removable mediums traditionally are seen as passive devices (without autonomous supply) and devoid of their own running means. In practice, recourse generally is had to storage means.

Such a removable medium is easily usable by the pilot from his hotel, with the aid of a portable personal computer comprising an ad hoc medium reader.

The interconnection of the removable medium with the on-board running system (via the medium reader) also allows the use thereof in any flight phase, for example via display and data-capture interfaces provided in the cockpit.

The running system may take the form of a computer system integrated into the vehicle or, for example, an equipment item of class III EGB type attached to the airplane.

Unloading of the application from the removable medium also is accomplished without a subsequent problem for the on-board system, by virtue of the installation of mechanisms preventing the application from leaving imprints or traces on the on-board computer platform during running thereof. In this way, an ample independence is ensured between the personal EFB and the platform so that, via the removable mediums, the airline company may freely deploy the applications that it desires without affecting the security of the on-board system. In this context, the data associated with the application for running thereof may be, for example, a driver, a library, a source code, an executable file, a configuration file, a computer register file. The latter are recorded in the removable medium and therefore are not deployed to the running system for storage.

This independence allows the computer platform not to be configured for a specific medium environment. It thus may accommodate, via various personalized removable mediums, various running environments, for example a flight environment assigned to a pilot and a test and simulation environment assigned to a maintenance operator.

Moreover, the on-board system remains safe because it is not polluted by data specific to a nonresident application.

In practice and as described farther on, the cockpit or a dedicated avionic bay may have a central processing unit (CPU) board connected to a screen dedicated to the information system, data-capture means (keyboard and/or mouse) or pointer dedicated to the information system and the medium reader accessible in the cockpit so that the pilot or the operator may connect thereto the medium containing the desired application.

In the departure lounge, for example, the pilot may connect his removable medium in an ad hoc reader provided on a PC terminal or on a portable personal computer, and in this way access the desired applications and mission data from outside the aircraft.

In one embodiment of the invention, the said application is a portable application.

In the known meaning, a "portable application" is a software program functioning autonomously in the computer file storing the data that are specific thereto, without prior installation on the hard disk of the host computer. It thus is possible to freely use this application and the associated personal data without leaving any trace on this host computer.

In this way, either problems or further developments linked to the need for effective cohabitation of several applications each leaving traces or imprints that may interfere on the computer are avoided. By the very nature of the portable applications, no integration thereof into the running system is necessary for the aircraft manufacturer. The latter avoids an over-development while the company, at leisure, freely may add, modify, these applications.

In the known systems of the state of the art, these traces or imprints are, for example, register-based inputs, modifications of environment variables, installations or updates of shared libraries, creations of temporary files, copies of applicative binary codes and configuration files on the hard disk of the host platform.

In particular, the running system comprises an applications launcher equipped to detect portable applications contained in a medium connected to the said reader, and the said portable application is launched from the applications launcher.

With the aid of ready-to-work ("plug and play" according to English terminology) mechanisms, there thus is obtained a rapid and automatic access, for the pilot or the operator, to the application contained in the removable medium, immediately upon connection of the latter in the reader.

The applications launcher, for example, may detect U3, Framakey (standards for the development of portable applications) files or any equivalent format, and display the corresponding applications for selection by the user.

In one embodiment, the said removable medium comprises an operating system, the method comprising, prior to the said running of the application, a step of start-up ("boot" according to English terminology), of the said running system on the said operating system, the said application being run in the environment of the said operating system of the removable medium.

The mechanisms for boot deported on the removable medium inserted in the reader make it possible to prevent any pollution of the host platform by the operating system ("Operating System" or OS according to English terminology) launched and the applications run in this operating system.

By virtue of the provisions of this embodiment, the operating system used by the pilot or the operator is not linked to the vehicle itself but to the removable medium. This solution makes it possible to be freed from certain legal provisions relating to operating-system use.

For example, there are licenses applicable to operating systems that depend on the territory concerned for the running thereof. It thus comes about that such operating systems are not introduced directly by the manufacturer of the vehicle, making it impossible for the purchasers to use applications developed in the environment of these operating systems. Consequently, by virtue of the above embodiment, the airline company itself may choose its operating system.

In particular, the said running system comprises a basic input/output system (BIOS) configured so as to start up ("to boot" according to a very common Anglicism) the said running system from an operating system stored on the removable medium connected to the said reader. The direct configuration of the BIOS makes it possible to automate the launching procedure for the running system and applications contained in the removable medium by a simple restarting of the running system of the on-board platform.

In one embodiment, the said running system comprises a virtual machine implemented at start-up, the said operating system being implemented in the said virtual machine.

By virtue of these provisions, one is freed from the hardware constraints of the host platform. In this way, the use of generic drivers stored in the removable medium, which must satisfy all the hardware configurations of host platforms with which the removable medium may be used, is avoided.

In place of that, drivers specific to the virtual machine provided on the running system are used; in particular the same virtual machine may be provided on all or part of the vehicles/aircraft constructed. With these specific drivers, more functionalities are accessed. The result is an improvement in the performances and services furnished by the operating system.

In particular, it also is provided that the said running system comprises an operating system equipped to be run in the said virtual machine.

By virtue of these virtualization provisions, at least two virtual computers are instantiated from a single hardware running system (CPU) so as to provide two separate environments, for example one linked to the aircraft manufacturer and the other linked to the airline company. In this way, one is freed from the use of two CPU, the cost, consumption and physical and thermal footprint of which would be greater.

In one embodiment, the said running means form part of a removable module of the said running system; in particular it may concern a removable CPU board.

According to this configuration, it is possible to adapt and to manage effectively the evolution of the capacity of the processing/running means all throughout the life of the vehicle (several tens of years for an aircraft). Care will be taken, however, to ensure that this CPU board follows the standards, for example ARINC 763, for compatibility with the rest of the host platform.

According to a specific characteristic of the invention, the said removable medium is one among the set comprising a USB key, a flash memory, a memory card (SD card, compact flash, . . . ), a compact disk, a DVD disk.

According to these examples, it is seen that the removable medium is a device without running means, in particular CPU. It concerns in particular a removable storage medium.

For purposes of minimum footprint, the removable medium also is without autonomous electrical supply, battery type.

The invention also applies to a method for running a computer application for interfacing with a crew of a vehicle, the method comprising:

the reading of a removable medium, comprising a portable application, by means of a removable-medium reader with which an on-board running system in the vehicle is equipped, the running of the said portable application by running means with which the said running system is equipped and connected to the said removable-medium reader.

The invention also applies to a method for running a computer application for interfacing with a crew of a vehicle, the method comprising:

the reading of a removable medium, comprising an operating system and the said application to be run, by means of a removable-medium reader with which an on-board running system in the vehicle is equipped, the booting of the said on-board running system on the said operating system of the removable medium, by running means with which the said running system is equipped and connected to the said removable-medium reader, the running of the said application in the said operating system.

The invention also relates to a kit for running a computer application for interfacing with a crew of a vehicle, the kit comprising:

a removable medium comprising the said application to be run, an on-board running system in the vehicle, comprising a removable-medium reader equipped to receive and read the removable medium and, connected to the said reader, running means equipped to run the said application contained in the said removable medium, the said removable medium being equipped so that the said running of the application requires the permanent recording of data necessary for execution thereof only on the said removable medium.

The invention also applies to a kit for running a computer application for interfacing with a crew of a vehicle, the said application using associated data necessary for running thereof, the kit comprising:

a removable medium comprising the said application to be run, an on-board running system in the vehicle, comprising a removable-medium reader equipped to receive and read the said removable medium and, connected to the said reader, running means equipped to run the said application contained in the said removable medium, the said removable medium being equipped so that the said running of the application does not require the permanent storage of the said associated data in the running system.

Optionally, one of the kits may comprise means relating to the method characteristics set forth above.

Particularly, the said application may be a portable application. In particular, the running system comprises an application launcher equipped to detect the applications contained in the said medium when the latter is connected to the said reader, for example by plug and play means.

As an alternative to or in combination with the portable application, an operating system may be provided in the said removable medium and the running system is equipped to boot (boot) on the said operating system, for example by appropriately defining the BIOS of the running system.

According to a specific characteristic, the running means form part of a removable module of the said running system.

The invention also applies to a kit for running a computer application for interfacing with a crew of a vehicle, the kit comprising:

a removable medium comprising a portable application, an on-board running system in the vehicle, comprising a removable-medium reader equipped to receive and read the said removable medium and, connected to the said reader, running means equipped to run the said portable application in the said removable medium.

The invention also applies to a kit for running a computer application for interfacing with a crew of a vehicle, the kit comprising:

a removable medium comprising an operating system and the said application to be run, an on-board running system in the vehicle, comprising a removable-medium reader equipped to receive and read the said removable medium and, connected to the said reader, running means equipped to boot the said on-board running system on the said operating system of the removable medium and to run the said application in the operating system.

The invention also applies to an aircraft comprising such a kit.

Since the advantages, purposes and specific characteristics of this kit and this aircraft are similar to those of the method that is the object of this invention, such as briefly set forth above, they are not repeated here.

The characteristics and advantages of this invention will emerge more clearly upon reading of a preferred embodiment illustrated by the attached drawings, in which.

This invention relates to running a computer application intended for a crew of a vehicle, here an aircraft 1, during which there is undertaken the connection for reading a removable medium, comprising the application to be run, to a removable-medium reader with which an on-board running system in the vehicle 1 is equipped, this running system comprising running means.

Figure 1:
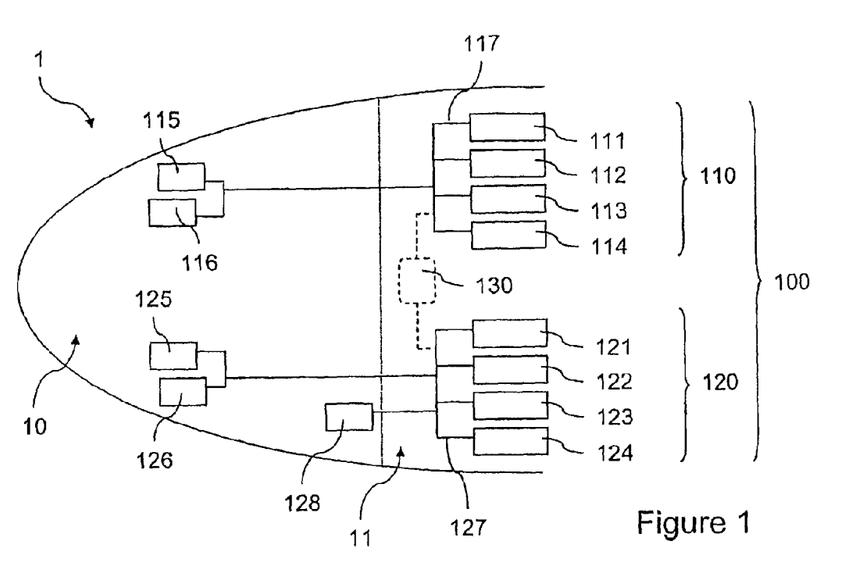
FIG. 1 shows an exemplary on-board system in an aircraft, for the implementation of the invention.

With reference of FIG. 1, the aircraft 1 has a cockpit 10 from which the pilots or maintenance agents may access an on-board system 100 of NSS ("Network Server System," network server system) type, having tools and applications for assistance in flying and in functioning of the aircraft 1.

The NSS system 100 comprises a subsystem 110, secured if need be, known as manufacturer domain or aircraft manufacturer domain, having a processing unit CPU 111, a volatile memory RAM 112, a hard disk 113, peripherals 114 and display and data-capture peripherals accessible from the cockpit, for example a screen 115 and a keyboard mouse 116. These equipment items are connected by a data bus 117.

The subsystem 110 may contain sensitive applications for the security of the airplane 1. Consequently, the aircraft manufacturer wishes to isolate this subsystem from any other subsystem in which third parties might intervene without appropriate qualification. In an implementation also contemplated, these sensitive applications may be provided in another subsystem, itself highly secured, separated from subsystem 110 by a unidirectional network diode. In this case, the subsystem 110 has the simple feature of being integrated by the manufacturer of the airplane. For the sake of simplicity, only subsystem 110 is indicated in the above two cases, with the specificity that in the second case, the certifications for hardware and for applications relate mainly to those provided for the highly secured subsystem.

The processor 111 allows the running of applications stored in hard disk 113. These applications are certified then integrated into subsystem 110 by the aircraft manufacturer.

The NSS system 100 also comprises a second subsystem 120, less secured than subsystem 110, in the sense that the conditions for certification and integration are less stringent.

This subsystem 120, or company domain or airliner domain, also comprises, connected by a data bus 127, a processing unit CPU 121 for running applications, a volatile memory RAM 122, a hard disk 123, peripherals 124 and display and data-capture peripherals accessible from the cockpit, for example a screen 125 and a keyboard/mouse 126.

With a view to saving space, the screens and keyboard/mouse 115, 116, 125 and 126 may be mutualized in the same devices with a control making it possible to go from one subsystem to the other.

Subsystems 110 and 120 are interconnected by a gateway 130, in particular allowing applications run on processor 121 to retrieve avionic parameters and data generated by secured subsystem 110. This retrieval may be accomplished by reading rights on the data and/or parameter files stored, for example, in hard disk 113 or transmitted by a peripheral 114.

In particular, the gateway 130 contributes to the security of the system by ensuring protection of subsystem 110 by limiting the rights for the applications run in subsystem 120, in particular the applications of a removable medium as introduced below, to access the data of subsystem 110.

Subsystem 120 moreover has a removable-medium reader 128, here a USB ("Universal Serial Bus" according to English terminology) key reader. The reader may be seen here as an interface that allows connection between the removable medium and the system so as to allow reading of the former. Generally, programs associated with this interface (for example drivers or equivalents) ensure this reading function. Several readers 128 may be provided, in particular in order to allow the connection of removable mediums having different interfacing formats, for example USB, Firewire (registered trade name), etc.

This reader 128 is accessible from the pilots' cockpit 10. Other readers 128 may be provided in subsystem 120, for example outside the cockpit so that maintenance agents may be connected to the said subsystem 120.

The processing equipment items without interaction with the pilots or other agents, in particular CPU 111, 112, random-access memories 112, 122, hard disks 113, 123 and peripherals 114, 124 may be integrated into a dedicated space, for example in an avionic computer bay 11, outside the cockpit 10.

Additional screens and data-capture means may be provided outside the cockpit 10 intended, for example, for the flight personnel in the passenger cabin.

Also, interfaces for connecting screens and/or data-capture means may be provided in addition to or in place of the said screens 115 and data-capture means 116, if need be outside the cockpit, in order to allow maintenance agents to intervene in the NSS system 100 from outside the cockpit 10.

Figure 2:
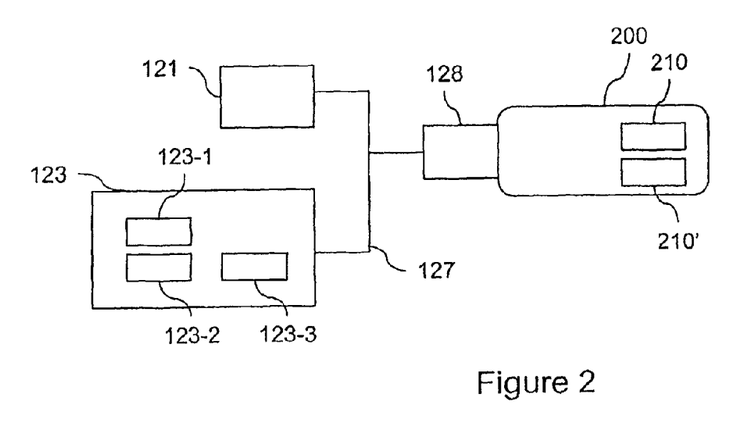
FIG. 2 schematically illustrates a first embodiment of the invention, for example in the system of FIG. 1.

With reference to FIG. 2, a first embodiment of the invention is illustrated with the aid of a simplified representation of subsystem 120 to which a pilot's USB key 200 is connected.

The pilot's USB key 200 constitutes a memory comprising one or more applications 210, 210', etc. that have been developed by the pilot's airline company to offer him assistance tools, for example for flight planning or procedure, such as the verification lists ("checklists"). These applications are applications for interfacing with the crew of the airplane (the pilot, among others).

Applications 210, 210' are developed in a portable-application format, for example U3 (Sandisk—registered trade name—standard) or Framakey (free software format). These portable applications have the feature of being ready for use on the USB key 200, that is to say that their use is carried out in secured manner and without leaving personal information items on the host machines, in particular on the hard disks, on which they are run, here on system 100.

It is noted that these applications do not modify, for running thereof, the operating system in which they are run and that moreover, they are sufficient in terms of libraries, that is to say that they are self-sufficient with libraries intrinsic to the operating system, without requiring the installation of new libraries, which would constitute a trace left on the host machine.

The deployment of these applications needs only the copy of the file containing the data associated with the application, that is to say the file of the application properly speaking (in U3 or Framakey format for example), its libraries, its configuration files and its possible data. In this way, the running thereof is accomplished directly from this file, therefore in this case from the removable medium in which the file is located.

The USB key 200 thus may be connected to the USB reader 128 in order to allow the running of application 210 by CPU 121. The USB key 200 thus is accessible in reading and if need be in writing in order to store data in its memory.

Hard disk 123 of subsystem 120 comprises an operating system OS (Operating System, for example Windows [registered trade name]) 123-1 that is launched at the start-up of subsystem 120, applications 123-2 already integrated by the aircraft manufacturer (and therefore certified) and an applications launcher 123-3.

This applications launcher 123-3 is launched by the ready-to-work (plug and play) mechanisms at the time of insertion of USB key 200 into reader 128. The applications launcher 123-3 is configured to detect, in the connected USB key, the applications set up according to a portable application standard, in particular U3 and Framakey.

The application then presents on screen 125 of the pilot or other personnel the list of portable applications detected for selection by the said pilot or other personnel with a view to running the selected application.

Figure 3:
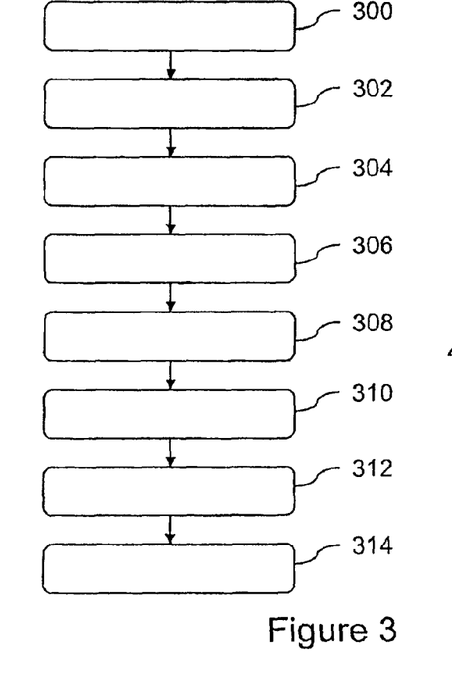
FIG. 3 shows, in the form of a logic diagram, steps of the first embodiment of the method according to the invention.

In detail, as illustrated by FIG. 3, when the pilot takes over the airplane 1 in order to carry out a flight, in step 300 he powers up the on-board system 100 and its components.

In step 302, subsystem 120 starts up through running of operating system 123-1.

At this stage, the pilot may use, in conventional manner, the applications 123-2 already integrated by the aircraft manufacturer (step 304).

In step 306, the pilot inserts into USB reader 128 the USB key 200 containing all his mission data, in particular the checklists and flight-planning lists. These data have been prepared beforehand by the pilot, for example at his hotel as explained farther on. These data are accessible through a portable application 210 developed by the airline company for all its pilots.

In step 308, subsystem 120 detects, through the plug and play mechanisms, the insertion of key 200 into reader 128 and starts up the application launcher 123-3. The latter 123-3 then scans the memory of the USB key in order to determine the presence of application files satisfying a portable application standard, for example files having a u3p extension for the U3 standard.

It may be provided to limit the scanning of the USB key in the root file or in a specific file so as to limit the detection time for large-capacity mediums.

At the end of step 308, application launcher 123-3 has established the set of portable applications present in key 200.

In step 310, application launcher 123-3 displays on the pilot's screen 125 the list of portable applications 210 detected.

In step 312, the pilot selects, with mouse 126, the desired application 210 and requests running thereof, for example by a simple click.

Application 210 then is run by the processor 121 by using random-access memory 122. However, no copy of files or configuration is made on hard disk 123.

In this way the pilot has data for his flight available. He also may enter information items that then are directly recorded in the memory of key 200, for a post-flight use, for example.

By way of example, the application 210 run may call upon services of the operating system 123-1 in order to print, for example, on a peripheral 124 of subsystem 120. In practice, portable application 210 provides a common dialogue box for management of printing already configured with the printers connected and configured with the printer selected by default.

As the operating system preferably is multitasking, the pilot may access several applications 123-2 and 123-3 at the same time.

At the end of use of application 210, the pilot closes application 210 in step 314. Because of the nature of portable applications 210, 210', no datum associated with the application run remains on the hard disk of subsystem 120.

In this way, by virtue of the invention, the airline company may develop its own applications and use them in the airplanes without prior certification and integration by the aircraft manufacturer.

It is noted that it also is conceivable for a pilot to connect his USB key 200 provided with a portable application to a USB reader (not shown) of secured subsystem 110.

As a result, a single subsystem 110 is conceivable without departing from the context of the invention.

It is noted also that the invention is applicable in the absence of launcher application 123-3, in which case the pilot must access, through the file system ("FileSystem" according to English terminology), the portable application file 210 to request running thereof.

Figure 4:
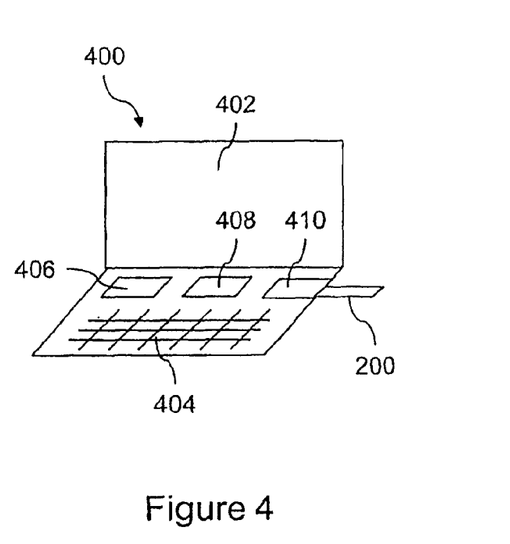
FIG. 4 illustrates an example of nomadic use of applications in connection with the first embodiment of the invention.

In reference to FIG. 4, the nomadic use of USB key 200 now is illustrated. As mentioned above, it appears helpful for the user of vehicle 1, here the pilot or the maintenance agent, to be able to prepare intervention data (mission, flight planning, maintenance-intervention data, for example) in advance and/or to use data recorded during this intervention for a subsequent operation, for example a flight report.

In being limited, for the description, only to the airplane pilot, the latter has available a portable personal computer 400. This tool allows him to perform this pre- or post-flight processing anywhere, in particular at his hotel or in the departure lounge.

By way of alternative, the pilot may be connected to a PC terminal (not shown) made available to him in the departure lounge or on a hotel computer.

This personal computer 400 is standard, has a screen 402, a keyboard 404, a processor CPU 406 for the running of applications, a hard disk 408 storing applications and an operating system, random-access memory (not shown) and a USB port associated with reading means 410. The on-board operating system on computer 400 is in particular of the same family, that is to say having a binary compatibility, as the one 123-1 integrated into the airplane 1 by the aircraft manufacturer.

The pilot then connects his USB key 200 on port 410 of computer 400. Either with the aid of a launcher application provided on computer 400 (and proceeding in a manner identical to that explained above), or directly through the on-board file system on board the computer 400, the pilot accesses his portable application 210 stored in key 200.

Portable application 210 then is run. The pilot performs the desired processings, for example modifies the data, reads them, adds to them, etc.

At the end of use, application 210 is closed. Since it concerns a portable application, no trace is left on computer 400 as well.

Figure 5:
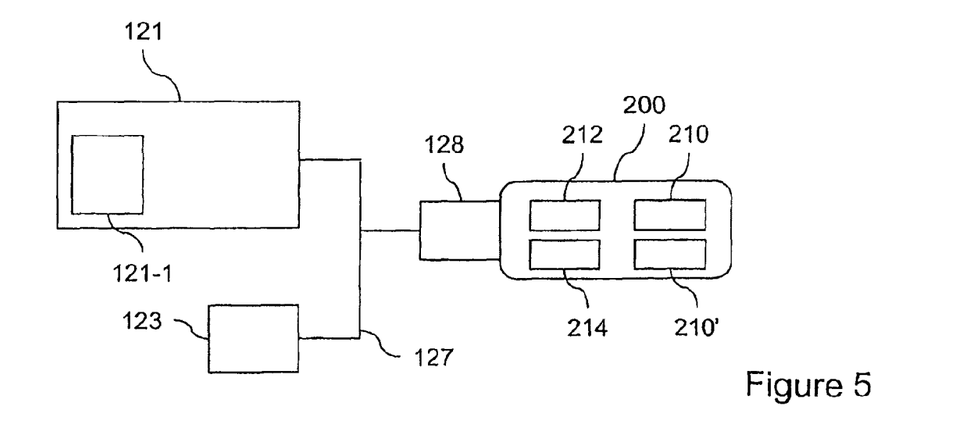
FIG. 5 schematically illustrates a second embodiment of the invention, for example in the system of FIG. 1.

With reference to FIG. 5, a second embodiment of the invention now is described.

In this second embodiment, the operating system for the running of application 210 no longer is on board in subsystem 110 or 120 but in the USB key 200 on which subsystem 120 boots (in the meaning of the Anglicism "to boot"). The other characteristics described above in connection with FIGS. 1 to 4 may apply to this embodiment.

FIG. 5 illustrates this second embodiment of the invention in greater detail with the aid of a simplified representation of subsystem 120 to which a pilot's USB key 200 is connected.

In FIG. 5, hard disk 123 does not store any specific datum. Nonetheless, it may be provided that an operating system, applications and associated data are stored thereon to be launched upon start-up of system 100 in the absence of USB key 200.

The processor 121 (and the motherboard of subsystem 120 in the broad sense) comprises, in read-only memory, a BIOS (Basic Input Output System) micro-software program 121-1 that specifies the list and order of the peripherals to be consulted for start-up of the operating system. For the individual skilled in the art, it concerns the boot order of the BIOS.

For the invention, the BIOS 121-1 specifies "booting" initially on USB reader 128 and, in default, starting up on hard disk 123. It is understood that the system may have several removable-medium readers 128 and that the corresponding BIOS may indicate each of these readers respectively in a predetermined order prior to consulting hard disk 123.

USB key 200 has, in addition to applications 210 and 210', an operating system 212 and drivers 214, possibly but not necessarily portable.

The operating system 212 is not installed, that is to say the configuration of which is not yet associated with a specific hardware (or hardware) layer.

The drivers 214 (or drivers according to English terminology) are certified beforehand by the aircraft manufacturer and provided to the airline companies having airplanes of this aircraft manufacturer. These drivers 214 preferably are generic in the sense that they allow an operating system 212 to recognize any type of hardware whatever may be the subsystem 120 and the airplane 1 used in association with the pilot's key 200. In this way, it is possible to use the key 200 on other computers.

In practice, the aircraft manufacturer provides the drivers for a certain number of major operating systems as well as for services accessible on a network provided by the aircraft-manufacturer domain (printing server, service for access to avionic parameters, KCCU [for "Keyboard Cursor Control Unit"]) unit. In this way, the airline company is free to integrate or not to integrate these functions on USB key 200 to allow the pilot to access same.

Figures 6, 8:
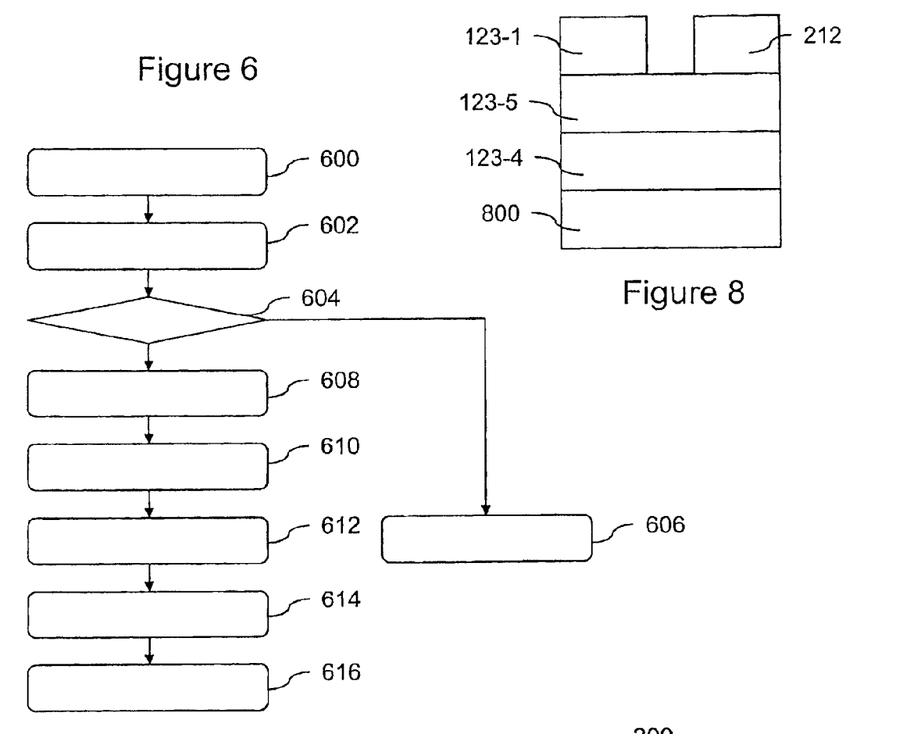
FIG. 6 shows, in the form of a logic diagram, steps of the second embodiment of the method according to the invention.
FIG. 8 schematically illustrates a fourth embodiment of the invention.

With reference to FIG. 6 which illustrates exemplary steps implemented in this second embodiment, the driver supplies system 100 and therefore its subsystems 110 and 120, in step 600.

In step 602, processor 121 accesses and runs BIOS 121-1.

At the first command of the BIOS, the system determines, in step 604, if there is an operating system accessible on USB port 128, that is to say if a USB key 200 accommodating an operating system is connected.

If not (step 606), subsystem 120 starts up on a following peripheral listed in the BIOS, for example on the operating system of hard disk 123.

If so (step 608), subsystem 120 loads operating system 212 in RAM memory for running thereof by processor 121.

In order to adapt operating system 212 to the hardware layer of subsystem 120, initialization of operating system 212 comprises, in step 610, the loading of generic drivers 214 present in key 200. Only the drivers 214 corresponding to the hardware peripherals and components installed are loaded by plug and play mechanisms.

In this way, at each restarting in a running subsystem 120, the operating system 212 finds the BIOS, the chipset, the CPU, the video card, the other peripherals of subsystem 120 and again loads the drivers useful for these various components present.

It is observed that the running of the operating system uses only random-access memory 122, the processor 121 and if need be peripherals 124. No datum is written on hard disk 123. In this way, when running of the operating system is concluded, no datum will remain, which allows the accommodation of a new USB key 200 with no inter-functioning problem.

Once the operating system 312 is running, either a dedicated application being run automatically lists the applications 210, 210' present on USB key 200 and presents them to the pilot during step 612, or the pilot himself, through the file system, accesses the application 210, 210' of his choice, in step 612.

In step 614, the pilot selects and launches the running of the desired application, for example the checklists application.

It is noted here that, since the operating system 212 is on USB key 200, the parameters or data associated with applications 210, 210' also are on key 200. In this way, no pollution of hard disk 123 is produced for the running of these applications. Portable applications such as set forth above, which guarantee that no datum is copied in another file, of course may be used.

The use of application 210 allows the pilot to access data (reading and/or writing) in key 200.

Once the operation of application 210 is concluded, in step 616, the running of the said application 210 is ended. No trace of this running is stored permanently in subsystem 120, in particular on hard disk 213.

As regards the nomadic use of key 200 by the pilot, computer 400 is configured in its BIOS in the same manner as subsystem 120 mentioned above in connection with FIGS. 5 and 6, namely booting on USB port 410. In this way, the pilot is able to start-up his operating system 212 on any PC, portable or not.

The pilot thus is in the same working environment outside the airplane and in the airplane. The portable PC 400 that the airline company provides to him for accessing the gate and service of the company is used only from the USB key after a restarting at the time of insertion of the key 200. In this way, hard disk 408 that contains the company office automation environment is not used and no trace is left thereon during use of the airplane working environment from USB key 200.

It thus is noted that the same portable PC 400 has two working environments independent of one another and without any porosity: company office automation and airplane environment (also called Flight Ops—flight operating system).

Figure 7:
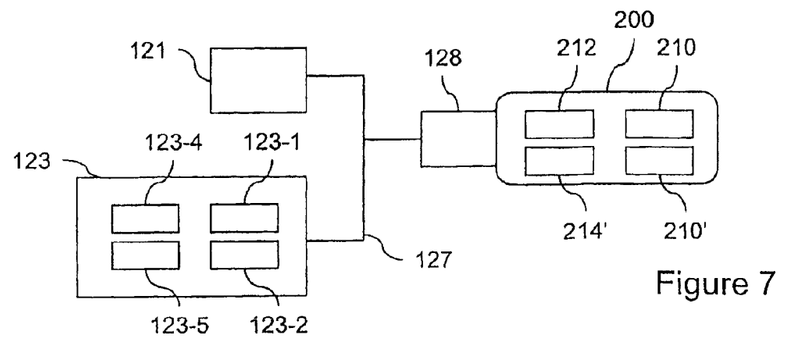
FIG. 7 schematically illustrates a third embodiment of the invention, for example in the system of FIG. 1.

With reference to FIGS. 7 and 8, a third embodiment of the invention now is described.

This third embodiment is very similar to the second embodiment set forth above, except that the subsystem 120 has a virtualization layer that frees the operating system 212 from hardware constraints, in particular with regard to drivers 214.

The characteristics described above in connection with FIGS. 1 to 6 may apply to this embodiment.

FIG. 7 illustrates this third embodiment of the invention in greater detail with the aid of a simplified representation of subsystem 120 to which a pilot's USB key 200 is connected.

In FIG. 7, hard disk 123 stores a first host operating system 123-4, for example a linux kernel or a linux distribution, a virtual machine 123-5 equipped to be run in this first operating system 123-4, a second operating system 123-1, for example the same as that mentioned above in connection with FIG. 2, and applications 123-2 that can be run in the second operating system. These various software components are integrated by the aircraft manufacturer.

The virtual machine may be in accordance with VMWare, QEmu or XEN, for example.

As illustrated by FIG. 8, at start-up of subsystem 120, the first operating system 123-4 is run directly on the specific hardware layer 800 of the airplane (by the use of appropriate drivers). Then, virtual machine 123-5 is launched automatically, followed by the "traditional" operating system 123-1 offering the pilot various applications 123-2.

Moreover, USB key 200 is similar to that described in connection with FIG. 5, except that, because of the virtualization layer 123-5, drivers 214' are not generic to satisfy a maximum of hardware layers 800, but are specific to the virtualization layer or virtual machine 123-5.

In practice, the booting order is specified in the simulated BIOS at the virtualization layer, by indicating the port on which a medium having an operating system, for example a CD-ROM, is presented and, if need be, other ports by default. Here, the USB port may be specified as main port for booting in order to start up on operating system 212.

It is noted that this third embodiment does not limit the number of operating systems run concurrently on the virtual machine, from the same hardware layer. In particular, no operating system may be provided in hard disk 123. Moreover, several readers 128 may be used in order to have several operating systems start up.

Finally, the presence of the virtualization layer 123-5 makes it possible to use the same processor both for the aircraft-manufacturer domain and the airliner domain. The separation between these two domains then is achieved by instantiation of each of the corresponding operating system in the virtual machine. In this way it is possible to have a single processor in the airplane.

A nomadic use of the USB key 200 (see FIG. 4 as well) also is conceivable, in which case the computer 400 will have the same linux kernel and virtual machine means as subsystem 120 mentioned above in connection with the third embodiment.

There now is described a variant of each of the embodiments described above, preferably of the second embodiment which presupposes that no software installation is provided a priori in subsystem 120.

This variant is based on the use of a removable module of processor 121, allowing the airline company itself to manage the obsolescence of CPU board 121.

The aircraft manufacturer thus provides an empty space for positioning a CPU board 121 at the free choice of the airline company. In this way, the latter may choose the CPU capacity that it requires. It likewise may decide on its replacement for obsolescence.

Thus, in addition to the software freedom obtained by virtue of the method that is the object of the invention, the airline company also has a partial hardware freedom on the on-board system 100, 110, 120.

According to a characteristic favoring the security of on-board system 100, the CPU boards 121 used are in accordance with avionic standards, for example relating to the electrical and/or thermal envelope, so as to guarantee a good availability of the function and a good security. An STC ("Supplemental Type Certification" according to English terminology) certification may be provided for this purpose.

By virtue of the invention the airline company may freely develop the applications that it desires and use them in its airplanes without requiring the intervention of the aircraft manufacturers for certification and integration.

The preceding examples are mere embodiments of the invention, which is not limited thereto.

In particular, in connection with the automotive world as mentioned above, a removable medium comprising a GPS navigation application may be provided.

The driver prepares, on his personal computer at home, his route and various crossing points.

In the vehicle, this same driver connects his key to his on-board computer (on-board system) that allows running of the navigation application according to any one of the embodiments contemplated above in connection with aviation.

It is noted that by virtue of the invention, the running of this application does not alter the security of the on-board automotive system and the removable medium with its application may be used in several vehicles.

The invention claimed is:

1. A method for running a computer application for interfacing with a crew of an aircraft, the method comprising:
reading a removable medium, which includes the computer application to be run, by a removable-medium reader to which an on-board running system in the aircraft is operatively connected; and
running, in a first aircraft domain, the computer application using a running system in the form of a Class III Electronic Flight Bag (EFB) operatively connected to the removable-medium reader, said running the computer application being performable in any and all flight phases of a flight of the aircraft,
wherein the running of the computer application requires permanent recording of data necessary for running the computer application only on the removable medium,
wherein the computer application is an uncertified computer application that has not been certified by a manufacturer of the aircraft,
wherein said running the computer application in the first aircraft domain is isolated from a second aircraft domain associated with the manufacturer of the aircraft, the second aircraft domain being more secure than the first aircraft domain,
wherein the second aircraft domain includes one or more applications certified by the manufacturer of the aircraft, and
wherein avionic parameters and data generated in the second aircraft domain are usable by the uncertified computer application according to read-only access.

2. A method according to claim 1, wherein the uncertified computer application is a portable computer application.

3. A method according to claim 2, wherein the running system includes an applications launcher configured to detect portable computer applications in the removable medium connected to the removable-medium reader, and to launch one or more of the portable computer applications.

4. A method according to claim 3, wherein the removable medium includes an operating system, and the method further comprises, prior to the running of the uncertified computer application, booting the running system on the operating system, the uncertified computer application being run in an environment of the operating system of the removable medium.

5. A method according to claim 4, wherein the running system includes a basic input/output system (BIOS) to boot the running system from the operating system, the operating system being stored on the removable medium connected to the removable-medium reader.

6. A method according to claim 4, wherein the running system includes a virtual machine run at start-up, the operating system being run in the virtual machine.

7. A method according to claim 6, wherein the running system includes an on-board operating system that runs in the virtual machine.

8. A method according to claim 2, wherein the removable medium includes an operating system, and the method further comprises, prior to the running of the uncertified computer application, booting the running system on the operating system, the uncertified computer application being run in an environment of the operating system of the removable medium.

9. A method according to claim 8, wherein the running system includes a basic input/output system (BIOS) to boot the running system from the operating system, the operating system being stored on the removable medium connected to the removable-medium reader.

10. A method according to claim 8, wherein the running system includes a virtual machine run at start-up, the operating system being run in the virtual machine.

11. A method according to claim 10, wherein the running system includes an on-board operating system that runs in the virtual machine.

12. A method according to claim 1, wherein the removable medium includes an operating system, and the method further comprises, prior to the running of the uncertified computer application, booting the running system on the operating system, the uncertified computer application being run in an environment of the operating system of the removable medium.

13. A method according to claim 12, wherein the running system includes a basic input/output system (BIOS) to boot the running system from the operating system, the operating system being stored on the removable medium connected to the removable-medium reader.

14. A method according to claim 12, wherein the running system includes a virtual machine run at start-up, the operating system being run in the virtual machine.

15. A method according to claim 14, wherein the running system includes an on-board operating system that runs in the virtual machine.

16. A method according to claim 1, wherein the running system includes a removable module.

17. A method according to claim 1, wherein said running the uncertified computer application using the running system includes instantiation of two virtual computers using a computer processing unit (CPU) of the running system so as to provide two separate running environments respectively associated with the first and second aircraft domains, the running environment associated with the second aircraft domain including the one or more applications certified by the manufacturer of the aircraft, each of which is specific to the manufacturer of the aircraft, and the running environment associated with the first aircraft domain being specific to a user of the aircraft other than the manufacturer.

18. A method according to claim 1, wherein no trace or imprint associated with the running of the uncertified computer application included in the removable medium remains in the running system upon completion of the running of the uncertified computer application.

19. A method according to claim 1,
wherein the first aircraft domain includes one or more applications certified by the manufacturer of the aircraft, and
wherein the avionic parameters and data generated in the second aircraft domain are usable by the one or more applications of the first aircraft domain certified by the manufacturer of the aircraft.

20. A method according to claim 19,
wherein the first aircraft domain includes a first processor,
wherein the second aircraft domain includes a second processor different from the first processor,
wherein the second processor runs the one or more applications of the second aircraft domain that are certified by the manufacturer of the aircraft, and
wherein the first processor runs the one or more applications of the first domain that are certified by the manufacturer of the aircraft and performs said running of the uncertified computer application.

21. A kit for running a computer application for interfacing with a crew of an aircraft, comprising:
a removable medium which includes the computer application to be run; and
an on-board running system in the form of a Class III Electronic Flight Bag (EFB) in the aircraft including a removable-medium reader configured to receive and read the removable medium and, connected to the removable-medium reader, the on-board running system being configured to run, in a first aircraft domain, the computer application in the removable medium, the running of the computer application being performable in any and all flight phases of a flight of the aircraft,
wherein the removable medium is configured such that the running of the computer application requires permanent recording of data necessary for running the computer application only on the removable medium,
wherein the computer application is an uncertified computer application that has not been certified by a manufacturer of the aircraft,
wherein the running of the computer application in the first aircraft domain is isolated from a second aircraft domain associated with the manufacturer of the aircraft, the second aircraft domain being more secure than the first aircraft domain,
wherein the second aircraft domain includes one or more applications certified by the manufacturer of the aircraft, and
wherein avionic parameters and data generated in the second aircraft domain are usable by the uncertified computer application according to read-only access.

22. The kit according to claim 21, wherein the crew of the aircraft is at least one of a pilot and a co-pilot.

* * * * *